(12) United States Patent
Nakayama

(10) Patent No.: US 11,414,237 B2
(45) Date of Patent: Aug. 16, 2022

(54) DELAMINATION CONTAINER

(71) Applicant: YOSHINO KOGYOSHO CO., LTD., Tokyo (JP)

(72) Inventor: Tadayori Nakayama, Tokyo (JP)

(73) Assignee: YOSHINO KOGYOSHO CO., LTD., Tokyo (JP)

( * ) Notice: Subject to any disclaimer, the term of this patent is extended or adjusted under 35 U.S.C. 154(b) by 37 days.

(21) Appl. No.: 17/188,954

(22) Filed: Mar. 1, 2021

(65) Prior Publication Data

US 2021/0269193 A1 Sep. 2, 2021

(30) Foreign Application Priority Data

Feb. 27, 2020 (JP) .............................. JP2020-032358

(51) Int. Cl.

| B65D 6/38 | (2006.01) |
|---|---|
| B65D 8/00 | (2006.01) |
| B32B 27/36 | (2006.01) |
| B32B 7/05 | (2019.01) |
| B32B 1/02 | (2006.01) |
| B32B 27/08 | (2006.01) |

(52) U.S. Cl.
CPC ................ *B65D 11/24* (2013.01); *B32B 1/02* (2013.01); *B32B 7/05* (2019.01); *B32B 27/08* (2013.01); *B32B 27/36* (2013.01); *B65D 11/04* (2013.01); *B32B 2439/60* (2013.01)

(58) Field of Classification Search
CPC ......... B32B 7/05; B32B 2439/60; B32B 1/02; B32B 27/36; B32B 27/08; B65D 11/24; B65D 11/04
See application file for complete search history.

(56) References Cited

FOREIGN PATENT DOCUMENTS

JP 2017-196822 A 11/2017

*Primary Examiner* — Ellen S Hock
(74) *Attorney, Agent, or Firm* — Oliff PLC

(57) ABSTRACT

A delamination container formed by blow molding a preform assembly includes: an outer layer body including a tubular outer mouth portion and a bottomed tubular barrel portion; an inner layer body including a tubular inner mouth portion fixed to an inner side of the outer mouth portion, and a containing portion separably laminated on an inner surface of the barrel portion and capable of volume-reduction deformation; an outside air introduction port; and a plurality of protrusions integrally provided in an upper end part of the barrel portion at intervals in a circumferential direction centering on an axial center of the outer mouth portion, the plurality of protrusions each projecting from an outer surface of the barrel portion and being recessed with respect to the inner surface of the barrel portion.

7 Claims, 3 Drawing Sheets

DELAMINATION CONTAINER

TECHNICAL FIELD

The present disclosure relates to a synthetic resin-made delamination container formed by blow molding a preform assembly in which an inner preform is incorporated inside an outer preform.

BACKGROUND

As a container for containing a food seasoning such as soy sauce, a beverage, cosmetics, a shampoo, a hair conditioner, a liquid soap, or the like as a content liquid, a synthetic resin-made delamination container having a double structure is known. The synthetic resin-made delamination container having a double structure is manufactured by blow molding a preform assembly in which an inner preform is incorporated inside an outer preform, and includes: an outer layer body including a tubular outer mouth portion and a bottomed tubular barrel portion connected to the outer mouth portion; an inner layer body including a tubular inner mouth portion located on the inner side of the outer mouth portion and a containing portion separably laminated on the inner surface of the barrel portion and capable of volume-reduction deformation; and an outside air introduction port for introducing outside air between the outer layer body and the inner layer body (for example, see PTL 1 (JP 2017-196822 A)).

Such a delamination container is used, for example, as a squeeze-type discharge container combined with a discharge cap having a check valve, or a pump-type container combined with a pump. The content liquid can be discharged to the outside by squeezing (compressing) the barrel portion of the outer layer body or operating the pump. After discharging the content liquid, outside air is introduced between the outer layer body and the inner layer body from the outside air introduction port, so that the containing portion of the inner layer body alone can be volume-reduction deformed while the original shape of the outer layer body is restored or maintained. With this delamination container, the content liquid contained in the containing portion of the inner layer body is discharged to the outside without replacing it with outside air, as a result of which contact of the content liquid contained inside the inner layer body with outside air can be reduced and degradation, degeneration, and the like of the content liquid can be suppressed.

CITATION LIST

Patent Literature

PTL 1: JP 2017-196822 A

SUMMARY

However, since the conventional delamination container is formed by blow molding the preform assembly in which the inner preform is incorporated inside the outer preform, the whole containing portion of the inner layer body is separable from the inner surface of the barrel portion. Hence, when discharging the content liquid, the containing portion is likely to be volume-reduction deformed while irregularly separating from the barrel portion of the outer layer body. In such a case, there is a possibility that parts of the inner surface of the containing portion in its intermediate part in the vertical direction come into tight contact with each other and the discharge path of the content liquid is narrowed or blocked, and as a result the content liquid cannot be fully discharged.

In view of this, in a delamination container formed by extrusion blow molding, an adhesion strip or a thick wall portion extending in the axial direction of the barrel portion is provided between the outer layer body and the inner layer body. This adhesion strip or thick wall portion restricts the separation of the inner layer body from the outer layer body, thus controlling the volume-reduction deformation of the containing portion of the inner layer body.

For the delamination container formed by blow molding the preform assembly in which the inner preform is incorporated inside the outer preform, however, it is difficult to provide an adhesion layer between the outer layer body and the inner layer body or provide a protrusion part for forming a thick wall portion in the inner layer body, and problems such as an increase in delamination container manufacturing cost arise.

It could therefore be helpful to provide a delamination container that can control volume-reduction deformation of a containing portion and reduce the remaining amount of a content liquid, at low cost.

A delamination container according to the present disclosure is a delamination container made of a synthetic resin and formed by blow molding a preform assembly in which an inner preform is incorporated inside an outer preform, the delamination container comprising: an outer layer body including a tubular outer mouth portion and a bottomed tubular barrel portion connected to the outer mouth portion; an inner layer body including a tubular inner mouth portion fixed to an inner side of the outer mouth portion, and a containing portion separably laminated on an inner surface of the barrel portion and capable of volume-reduction deformation; an outside air introduction port for introducing outside air between the outer layer body and the inner layer body; and a plurality of protrusions integrally provided in an upper end part of the barrel portion at intervals in a circumferential direction centering on an axial center of the outer mouth portion, the plurality of protrusions each projecting from an outer surface of the barrel portion and being recessed with respect to the inner surface of the barrel portion.

Preferably, in the delamination container according to the present disclosure, the barrel portion includes: a shoulder portion integrally connected to a lower end of the outer mouth portion; a tubular barrel body portion integrally connected to a lower end of the shoulder portion; and a bottom portion integrally connected to a lower end of the barrel body portion and closing the lower end of the barrel body portion, and the plurality of protrusions are connected to an upper end of the shoulder portion.

Preferably, in the delamination container according to the present disclosure, the plurality of protrusions each include: an upper wall portion extending toward a radial outside of the outer mouth portion from the upper end of the shoulder portion; and a vertical wall portion extending downward from a radial outer end of the upper wall portion.

Preferably, in the delamination container according to the present disclosure, the outside air introduction port is a through hole passing through the outer mouth portion in a radial direction, and a position of the outside air introduction port in the circumferential direction centering on the axial center of the outer mouth portion matches a position of the protrusion in the circumferential direction centering on the axial center of the outer mouth portion.

Preferably, in the delamination container according to the present disclosure, the plurality of protrusions are arranged at equal intervals in the circumferential direction centering on the axial center of the outer mouth portion.

Preferably, in the delamination container according to the present disclosure, the plurality of protrusions are three or four protrusions arranged at equal intervals in the circumferential direction centering on the axial center of the outer mouth portion.

Preferably, in the delamination container according to the present disclosure, the outer layer body and the inner layer body are each made of polyethylene terephthalate resin.

It is therefore possible to provide a delamination container that can control volume-reduction deformation of a containing portion and reduce the remaining amount of a content liquid, at low cost.

DETAILED DESCRIPTION

More detailed description will be given below with reference to the drawings.

Figure 1:
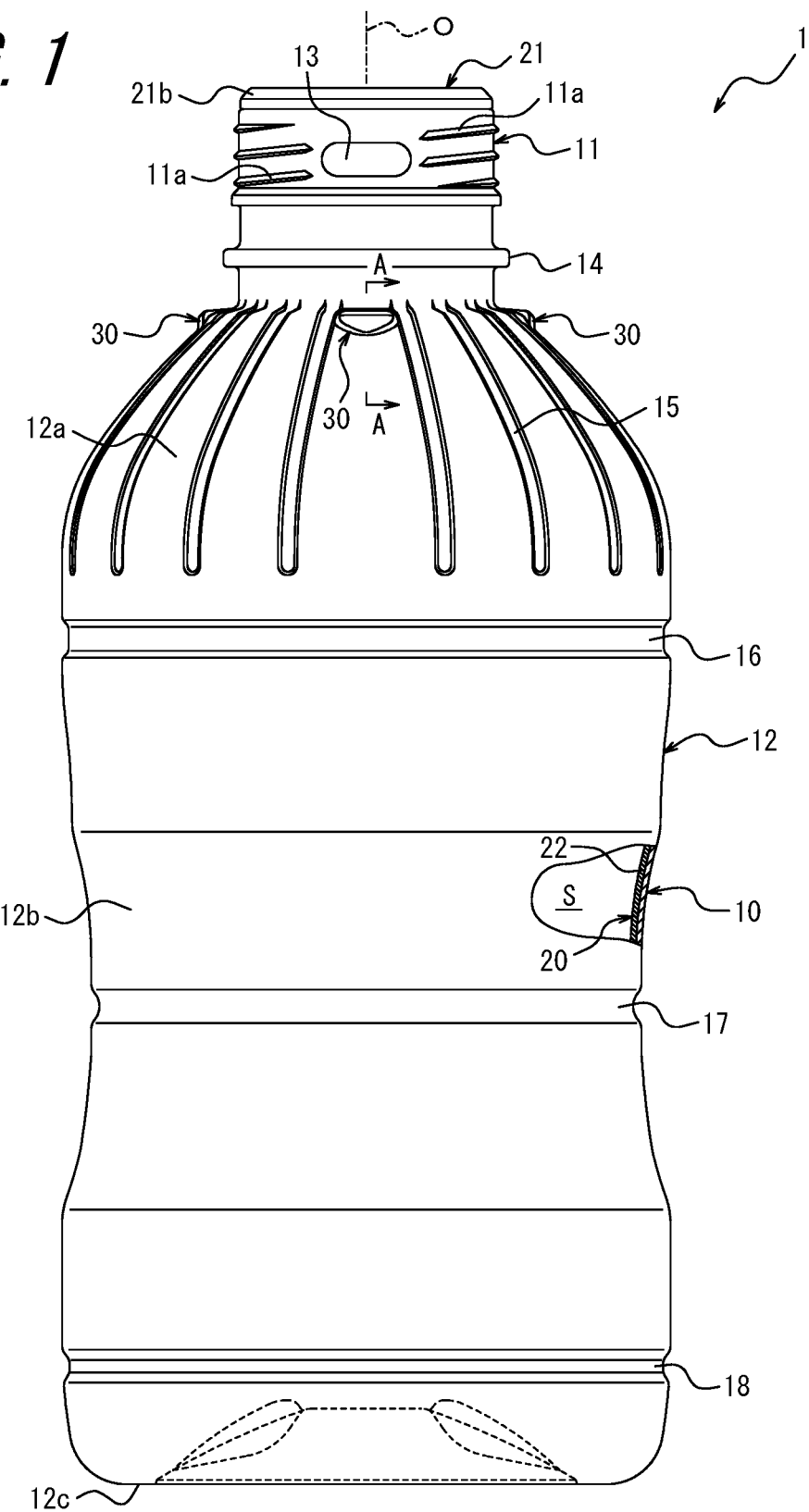
FIG. 1 is a partially cutaway front view of a delamination container according to one of the disclosed embodiments.

A delamination container 1 according to one of the disclosed embodiments illustrated in FIG. 1 is made of a synthetic resin, and has a double structure including an outer layer body 10 and an inner layer body 20. An example in which the delamination container 1 is used as a squeeze-type discharge container for containing a food seasoning such as soy sauce as a content liquid will be described below.

In the description, the claims, and the drawings, the term "vertical direction" (upward-downward) refers to an upward-downward direction in a state in which the delamination container 1 is in an upright position as illustrated in FIG. 1, and the term "radial direction" refers to a direction along a straight line that passes the axial center O of the delamination container 1 and is perpendicular to the axial center O.

The delamination container 1 is a blow molded part formed by blow molding a preform assembly having a double structure in which an inner preform as a synthetic resin-made injection molded part for forming an inner layer body 20 is incorporated inside an outer preform as a synthetic resin-made injection molded part for forming an outer layer body 10.

In this embodiment, the outer layer body 10 and the inner layer body 20 are each made of polyethylene terephthalate resin (PET). As a result of the outer layer body 10 and the inner layer body 20 each being made of polyethylene terephthalate resin, the delamination container 1 can be a lightweight and highly transparent container.

The outer layer body 10 is a part constituting an outer shell of the delamination container 1, and includes a tubular outer mouth portion 11 and a bottomed tubular barrel portion 12 integrally connected to the lower end of the outer mouth portion 11. The outer mouth portion 11 is a part not stretched when blow molding the preform assembly. The barrel portion 12 is a part stretched when blow molding the preform assembly.

Figure 2:
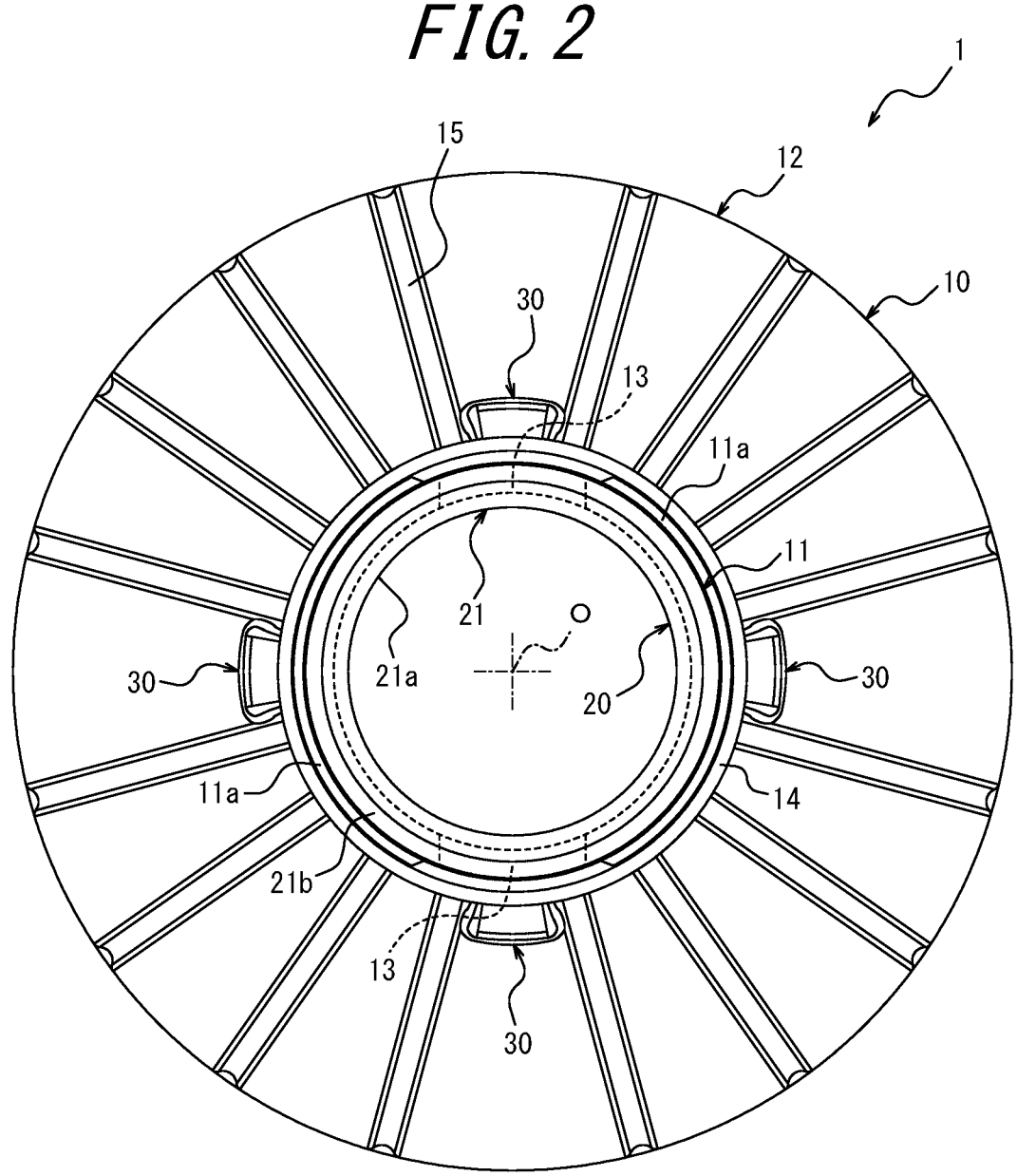
FIG. 2 is a plan view of the delamination container illustrated in FIG. 1.

The outer mouth portion 11 has a predetermined thickness, and is not easily deformable. In this embodiment, the outer mouth portion 11 is cylindrical, and a male screw 11a is integrally provided on the outer circumferential surface of the outer mouth portion 11, as illustrated in FIGS. 1 and 2. A discharge cap (not illustrated) having a discharge port can be attached to the outer mouth portion 11 by screw connection to the male screw 11a.

The outer mouth portion 11 may include an annular protrusion instead of the male screw 11a, so that a discharge cap can be attached to the outer mouth portion 11 by undercut engagement with the protrusion through capping. In this case, the outer mouth portion 11 is not limited to be cylindrical, as long as it is tubular. For example, the outer mouth portion 11 may be square tubular or elliptic tubular.

The outer mouth portion 11 has a pair of outside air introduction ports 13. The pair of outside air introduction ports 13 are each a through hole of a long hole shape passing through the outer mouth portion 11 in the radial direction and extending in the circumferential direction, and are located symmetrically with each other on both sides of the axial center O of the outer mouth portion 11. The pair of outside air introduction ports 13 each communicate with the part between the outer layer body 10 and the inner layer body 20, and can introduce outside air between the outer layer body 10 and the inner layer body 20.

A neck ring 14 is integrally provided on the side lower than the outside air introduction ports 14 of the outer mouth portion 11. The neck ring 14 annularly extends on the whole circumference of the outer mouth portion 11, and projects radially outward from the outer circumferential surface of the outer mouth portion 11. In the outer mouth portion 11, a cylindrical portion is provided below the neck ring 14.

In this embodiment, the barrel portion 12 includes a shoulder portion 12a, a barrel body portion 12b, and a bottom portion 12c. That is, the delamination container 1 has a bottle shape.

The shoulder portion 12a is integrally connected to the lower end of the outer mouth portion 11, and gradually increases in diameter downward and projects radially outward over the outer mouth portion 11. The barrel body portion 12b has a tubular shape having a constricted part and approximately circular in cross section, and is integrally connected to the lower end of the shoulder portion 12a at its upper end. The bottom portion 12c is integrally connected to the lower end of the barrel body portion 12b, and closes the lower end of the barrel body portion 12b. The bottom portion 12c has a shape of being depressed on the inner side of the annular outer circumferential edge. By grounding the bottom portion 12c, the delamination container 1 can be placed in an upright position.

The barrel body portion 12b is flexible, and can elastically deform and dent when squeezed (compressed) and, by the elastic force, return to the original shape from the dented state by itself. As a result of the barrel body portion 12b being configured to be elastically deformable by squeezing, in the case where the delamination container 1 is used as a squeeze-type discharge container, the content liquid discharge operation can be performed easily. Moreover, after the discharge of the content liquid, the barrel body portion 12b easily returns to the original shape, thus ensuring that outside air is introduced between the outer layer body 10 and the inner layer body 20 through the outside air introduction ports 13. Hence, the delamination container 1 can reliably achieve its functions.

The shoulder portion 12a has a plurality of (e.g. sixteen) recessed ribs 15 extending in the vertical direction. In FIGS.

1 and 2, only one recessed rib 15 is given the reference sign, for the sake of convenience. Four recessed ribs 15 form one set. In each set, four recessed ribs 15 are arranged at equal intervals in the circumferential direction. The sets are arranged at equal intervals in the circumferential direction so that adjacent sets are more widely spaced from each other than adjacent recessed ribs 15 in the same set. As a result of the shoulder portion 12a having the plurality of recessed ribs 15, the inner layer body 20 can be easily separated from the outer layer body 10 at the shoulder portion 12a.

Alternatively, the shoulder portion 12a may not have the recessed ribs 15.

A structure in which an annular groove 16 is provided between the shoulder portion 12a and the barrel body portion 12b, an annular groove 17 is provided at a vertical center of the constricted part of the barrel body portion 12b, and an annular groove 18 is provided between the barrel body portion 12b and the bottom portion 12c may be used. Alternatively, these annular grooves 16 to 18 may not be provided.

The inner layer body 20 includes a tubular inner mouth portion 21 and a containing portion 22. The inner mouth portion 21 is a part not stretched when blow molding the preform assembly. The containing portion 22 is a part stretched when blow molding the preform assembly.

Figure 3:
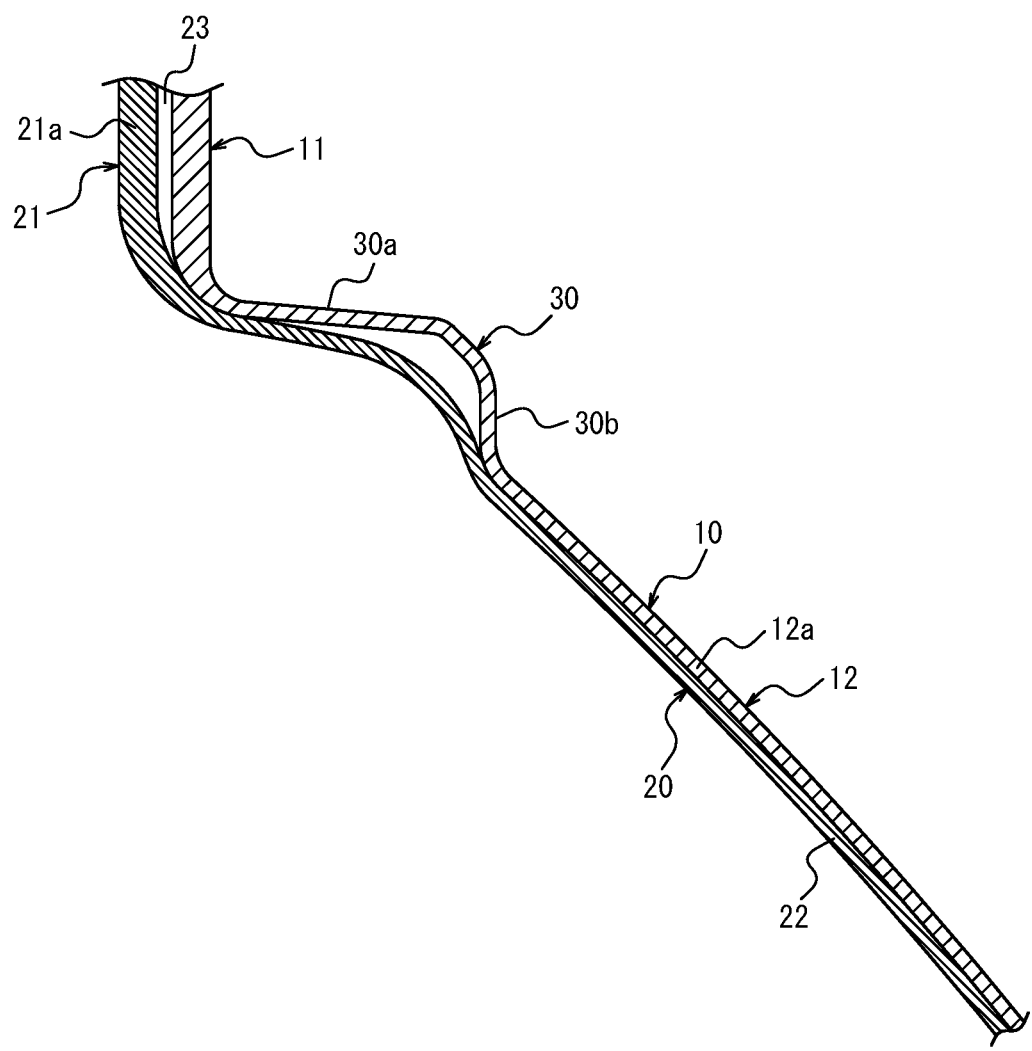
FIG. 3 is a sectional view along line A-A in FIG. 1.

The inner mouth portion 21 includes a cylindrical portion 21a smaller in diameter than the outer mouth portion 11 and a flange portion 21b integrally connected to the upper end of the cylindrical portion 21a, and is fixed to the outer mouth portion 11 in a state in which the cylindrical portion 21a is located on the inner side of the outer mouth portion 11 coaxially with the outer mouth portion 11. The inner mouth portion 21 has a predetermined thickness, and is not easily deformable. As illustrated in FIG. 3, a gap 23 with predetermined spacing is formed between the inner circumferential surface of the outer mouth portion 11 and the outer circumferential surface of the cylindrical portion 21a of the inner mouth portion 21. The gap 23 connects to the outside air introduction ports 13, and reaches the lower end of the outer mouth portion 11.

The flange portion 21b abuts the upper end of the outer mouth portion 11 on the whole circumference. Thus, the gap 23 between the outer mouth portion 11 and the cylindrical portion 21a of the inner mouth portion 21 is blocked from the outside at the upper end of the outer mouth portion 11 and the inner mouth portion 21, and the inner mouth portion 21 is positioned relative to the outer mouth portion 11 in the axial direction.

The inner mouth portion 21 is not limited to be cylindrical, as long as it is tubular. For example, in the case where the outer mouth portion 11 is square tubular or elliptic tubular, the outer mouth portion 11 may equally be square tubular or elliptic tubular.

As illustrated in FIGS. 1 and 3, the containing portion 22 has a bag shape thinner and more flexible than the barrel portion 12. The containing portion 22 is integrally connected to the lower end of the inner mouth portion 21, and is separably laminated on the inner surface of the barrel portion 12. The inside of the containing portion 22 is a space S for containing the content liquid. The containing portion 22 can be filled with the content liquid through the inner mouth portion 21, and the content liquid contained in the containing portion 22 can be discharged to the outside through the inner mouth portion 21. The containing portion 22 can be volume-reduction deformed (deformed so as to reduce the inner volume) while separating from the inner surface of the barrel portion 12, with the discharge of the content liquid.

The delamination container 1 according to this embodiment having the above-described structure can form a squeeze container when a discharge cap is attached to the outer mouth portion 11. The discharge cap in this case may have, for example, a structure including an outside air check valve for allowing outside air to be introduced into the outside air introduction port 13 and preventing outside air from flowing outside from the outside air introduction port 13 and a content liquid check valve for allowing the content liquid to be discharged to the outside through the inner mouth portion 21 and preventing backward flow of outside air into the containing portion 22.

In the delamination container 1 formed as a squeeze container, when the barrel body portion 12b of the outer layer body 10 is squeezed (compressed), the containing portion 22 volume-reduction deforms, and the content liquid is pushed out of the discharge cap and discharged to the outside. When the squeeze of the barrel body portion 12b is released after the content liquid is discharged, the barrel body portion 12b tries to return to the original shape. Here, the containing portion 22 of the inner layer body 20 separates from the inner surface of the barrel portion 12 while outside air is introduced between the outer layer body 10 and the inner layer body 20 from the outside air introduction port 13. Thus, only the barrel body portion 12b returns to the original shape while the containing portion 22 remains volume-reduction deformed. In this way, the content liquid contained in the containing portion 22 can be discharged without replacing it with outside air, so that contact of the content liquid contained in the containing portion 22 with outside air can be reduced and degradation and degeneration of the content liquid can be suppressed.

To control the volume-reduction deformation of the containing portion 22 resulting from the discharge of the content liquid and reduce the remaining amount of the content liquid in the containing space S, a plurality of protrusions 30 are integrally provided in an upper end part of the barrel portion 12 of the outer layer body 10 at intervals in the circumferential direction centering on the axial center O of the outer mouth portion 11.

As illustrated in FIG. 3, each protrusion 30 has a shape that projects outward from the outer surface of the shoulder portion 12a and is recessed with respect to the inner surface of the shoulder portion 12a of the barrel portion 12. That is, each protrusion 30 has a shape in which part of the barrel portion 12 expands outward. The circumferential width of each protrusion 30 is sufficiently small relative to the whole circumference of the upper end of the shoulder portion 12a, and the vertical length of each protrusion 30 is sufficiently small relative to the vertical length of the shoulder portion 12a.

In this embodiment, the circumferential width of each protrusion 30 is smaller than the circumferential width of each outside air introduction port 13, and each protrusion 30 is located between recessed ribs 15 of adjacent sets.

In the part where the protrusions 30 are provided, the containing portion 22 of the inner layer body 20 is shaped along the protrusion 30 (including a shape with a slight gap). That is, in the part of the barrel portion 12 where the protrusions 30 are provided, the containing portion 22 is caught on the inner surface of each protrusion 30, and does not easily separate from the outer layer body 10.

Therefore, as a result of the plurality of protrusions 30 being provided, the containing portion 22 that volume-reduction deforms with the discharge of the content liquid is controlled to separate from the inner surface of the barrel portion 12 starting from the part where the protrusions 30 are provided, and thus regularly volume-reduction deforms in the part where the protrusions 30 are not provided.

Hence, in the delamination container 1 according to this embodiment, the protrusions 30 are provided in the upper end part of the barrel portion 12, so that the containing portion 22 that volume-reduction deforms with the discharge of the content liquid can be controlled to separate from the inner surface of the barrel portion 12 starting from the part where the protrusions 30 are provided and thus regularly volume-reduction deform in the part where the protrusions 30 are not provided. That is, in the delamination container 1 according to this embodiment, with a simple structure of integrally providing the protrusions 30 in the upper end part of the barrel portion 12, the volume-reduction deformation of the containing portion 22 can be controlled to cause the containing portion 22 to regularly volume-reduction deform, with no need to provide an adhesion strip for partly bonding the outer layer body 10 and the inner layer body 20. Moreover, in the delamination container 1 according to this embodiment, the plurality of protrusions 30 are arranged at intervals in the circumferential direction centering on the axial center O of the outer mouth portion 11. Hence, the containing portion 22 is held to the barrel portion 12 by the protrusions 30 in a plurality of separate locations in the circumferential direction, so that the containing portion 22 can be regularly volume-reduction deformed between the protrusions 30 more reliably. The remaining amount of the content liquid can thus be reduced, by preventing such a situation in which, when the remaining amount of the content liquid decreases, the containing portion 22 irregularly deforms and as a result the content liquid cannot be fully discharged.

Although it is preferable that the containing portion 22 is caught on all protrusions 30 and held to the barrel portion 12 by the protrusions 30, the presently disclosed techniques are not limited to such. As long as the containing portion 22 is held to the barrel portion 12 by at least one protrusion 30, the containing portion 22 may separate from other protrusions 30.

As described above, in this embodiment, the delamination container 1 has a bottle shape in which the barrel portion 12 has the shoulder portion 12a, and the protrusions 30 are connected to the upper end of the shoulder portion 12a (the part of connection with the outer mouth portion 11).

Hence, the upper end of the containing portion 22 is more reliably held to the barrel portion 12 by the protrusions 30 in the boundary between the tubular outer mouth portion 11 and the shoulder portion 12a, so that the containing portion 22 can be regularly volume-reduction deformed more reliably in the part where the protrusions 30 are not provided.

As illustrated in FIG. 3, in the delamination container 1 according to this embodiment, each protrusion 30 is shaped to have an upper wall portion 30a extending toward the radial outside of the outer mouth portion 11 from the upper end of the shoulder portion 12a, and a vertical wall portion 30b extending downward from the radial outer end of the upper wall portion 30a.

As a result of each protrusion 30 including the upper wall portion 30a and the vertical wall portion 30b, the containing portion 22 is caught on the protrusion 30 more firmly, and thus the containing portion 22 can be held to the barrel portion 12 by the protrusion 30 more reliably. Accordingly, the containing portion 22 can be regularly volume-reduction deformed more reliably in the part where the protrusions 30 are not provided.

As illustrated in FIG. 1, in the delamination container 1 according to this embodiment, each outside air introduction port 13 provided in the outer mouth portion 11 is located so that its position in the circumferential direction centering on the axial center O matches the position of a protrusion 30 in the circumferential direction centering on the axial center O. That is, the protrusion 30 is provided directly below the outside air introduction port 13.

Thus, in the delamination container 1 according to this embodiment, the position of the outside air introduction port 13 in the outer mouth portion 11 in the circumferential direction centering on the axial center O matches the position of the protrusion 30 in the circumferential direction centering on the axial center O. Therefore, outside air introduced from the outside air introduction port 13 evenly flows on both sides of the protrusion 30 in the circumferential direction, between the containing portion 22 and the barrel portion 12, so that the part of the containing portion 22 where the protrusions 30 are not provided can be regularly volume-reduction deformed more reliably.

In the delamination container 1 according to this embodiment, it is preferable to arrange three or four protrusions 30 in the upper end part of the barrel portion 12 at equal intervals in the circumferential direction centering on the axial center O.

In the delamination container 1 according to this embodiment, four protrusions 30 are arranged in the upper end part of the barrel portion 12 at equal intervals in the circumferential direction, as illustrated in FIGS. 1 and 2. The four protrusions 30 are each located between recessed ribs 15 of adjacent sets. The width of one protrusion 30 in the circumferential direction is smaller than the interval between adjacent protrusions 30 in the circumferential direction.

In the case where the number of protrusions 30 provided in the upper end part of the barrel portion 12 is excessively large, the amount of displacement of the containing portion 22 toward the axial center O side between adjacent protrusions 30 is limited, and a space tends to remain in the part of the axial center O of the volume-reduction deformed containing portion 22. In the case where three or four protrusions 30 are arranged in the upper end part of the barrel portion 12 at equal intervals in the circumferential direction centering on the axial center O, on the other hand, the containing portion 22 is held to the barrel portion 12 by the protrusions 30 evenly in three or four separate locations in the circumferential direction, so that the containing portion 22 can be regularly volume-reduction deformed between the protrusions 30 more reliably. Moreover, the containing portion 22 is allowed to be displaced to the vicinity of the axial center O, thus preventing a space from remaining in the part of the axial center O of the volume-reduction deformed containing portion 22.

The presently disclosed techniques are not limited to the foregoing embodiment, and various changes are possible within the scope of the present disclosure.

For example, although the embodiment describes the case where four protrusions 30 are provided in the upper end part of the barrel portion 12, the number of protrusions 30 may be changed as appropriate as long as it is two or more.

Although the embodiment describes the case where each protrusion 30 is shaped to have the upper wall portion 30a extending toward the radial outside of the outer mouth portion 11 from the upper end of the shoulder portion 12a and the vertical wall portion 30b extending downward from the radial outer end of the upper wall portion 30a, the presently disclosed techniques are not limited to such, and any of various shapes may be used.

Although the embodiment describes the case where the pair of outside air introduction ports 13 are provided in the outer mouth portion 11, the number of outside air introduction ports 13 may be one or more.

Although the embodiment describes the case where the outside air introduction port 13 is a through hole formed through the outer mouth portion 11 in the radial direction, the presently disclosed techniques are not limited to such. For example, the outside air introduction port 14 may be a gap formed between the upper end of the outer mouth portion 11 and the upper end of the inner mouth portion 21 to be open to the outside. Alternatively, the outside air introduction port 13 may be provided in the shoulder portion 12a, the barrel body portion 12b, or the bottom portion 12c.

The material of the outer layer body 10 is not limited to polyethylene terephthalate resin, and may be other synthetic resin material such as polyester resin, polyolefin resin, nylon resin, polycarbonate resin (PC resin), cycloolefin copolymer resin (COC resin), or cycloolefin polymer resin (COP resin).

The material of the inner layer body 20 is not limited to polyethylene terephthalate resin, and may be other synthetic resin material such as polyester resin, polyolefin resin, nylon resin, polycarbonate resin (PC resin), cycloolefin copolymer resin (COC resin), cycloolefin polymer resin (COP resin), or ethylene-vinyl alcohol copolymer resin (EVOH resin). In the case where ethylene-vinyl alcohol copolymer resin is used as the material of the inner layer body 20, an ethylene-vinyl alcohol copolymer resin having appropriate ethylene content may be employed in view of barrier property and flexibility. The inner layer body 20 may have, for example, a multilayer structure in which a barrier layer such as an MX nylon resin layer is provided between a pair of polyethylene terephthalate resin layers, to ensure barrier property.

Although the embodiment describes the case where the delamination container 1 has a bottle shape in which the barrel portion 12 includes the shoulder portion 12a, the barrel body portion 12b, and the bottom portion 12c, any of various shapes may be used.

Although the foregoing embodiment describes the case where the delamination container 1 is used as a squeeze-type discharge container to which a discharge cap having a discharge port is attached at the outer mouth portion 11 and that discharges the content liquid when the barrel portion 12 is squeezed, the delamination container 1 may be used as a pump-type container in which the barrel portion 12 has predetermined rigidity and is not easily deformable by squeezing and to which a pump-type discharge tool is attached at the outer mouth portion 11.

REFERENCE SIGNS LIST 1 delamination container
10 outer layer body
11 outer mouth portion
11a male screw
12 barrel portion
12a shoulder portion
12b barrel body portion
12c bottom portion
13 outside air introduction port
14 neck ring
15 recessed rib
16 annular groove
17 annular groove
18 annular groove
20 inner layer body
21 inner mouth portion
21a cylindrical portion
21b flange portion
22 containing portion
23 gap
30 protrusion
30a upper wall portion
30b vertical wall portion
O axial center
S containing space

The invention claimed is:

1. A delamination container made of a synthetic resin and formed by blow molding a preform assembly in which an inner preform is incorporated inside an outer preform, the delamination container comprising:
   an outer layer body including a tubular outer mouth portion and a bottomed tubular barrel portion connected to the outer mouth portion;
   an inner layer body including a tubular inner mouth portion fixed to an inner side of the outer mouth portion, and a containing portion separably laminated on an inner surface of the barrel portion and capable of volume-reduction deformation;
   an outside air introduction port for introducing outside air between the outer layer body and the inner layer body; and
   a plurality of protrusions integrally provided in an upper end part of the barrel portion at intervals in a circumferential direction centering on an axial center of the outer mouth portion, the plurality of protrusions each projecting from an outer surface of the barrel portion and being recessed with respect to the inner surface of the barrel portion.

2. The delamination container according to claim 1, wherein the barrel portion includes: a shoulder portion integrally connected to a lower end of the outer mouth portion; a tubular barrel body portion integrally connected to a lower end of the shoulder portion; and a bottom portion integrally connected to a lower end of the barrel body portion and closing the lower end of the barrel body portion, and
   the plurality of protrusions are connected to an upper end of the shoulder portion.

3. The delamination container according to claim 2, wherein the plurality of protrusions each include: an upper wall portion extending toward a radial outside of the outer mouth portion from the upper end of the shoulder portion; and a vertical wall portion extending downward from a radial outer end of the upper wall portion.

4. The delamination container according to claim 1, wherein the outside air introduction port is a through hole passing through the outer mouth portion in a radial direction, and
   a position of the outside air introduction port in the circumferential direction centering on the axial center of the outer mouth portion matches a position of the protrusion in the circumferential direction centering on the axial center of the outer mouth portion.

5. The delamination container according to claim 1, wherein the plurality of protrusions are arranged at equal intervals in the circumferential direction centering on the axial center of the outer mouth portion.

6. The delamination container according to claim 5, wherein the plurality of protrusions are three or four protrusions arranged at equal intervals in the circumferential direction centering on the axial center of the outer mouth portion.

7. The delamination container according to claim 1, wherein the outer layer body and the inner layer body are each made of polyethylene terephthalate resin.

* * * * *